(12) United States Patent
Deterling (10) Patent No.: US 11,559,950 B2
(45) Date of Patent: Jan. 24, 2023

(54) ADJUSTABLE SEALING BAR FOR PRE-APPLIED BOTTOM GUSSET PACKAGE AND METHOD OF USING THE SAME

(71) Applicant: Southwest Formseal, Houston, TX (US)

(72) Inventor: John Deterling, Houston, TX (US)

( * ) Notice: Subject to any disclaimer, the term of this patent is extended or adjusted under 35 U.S.C. 154(b) by 256 days.

(21) Appl. No.: 16/774,643

(22) Filed: Jan. 28, 2020

(65) Prior Publication Data
US 2020/0331211 A1 Oct. 22, 2020

Related U.S. Application Data

(60) Provisional application No. 62/920,201, filed on Apr. 19, 2019.

(51) Int. Cl.
| | |
|---|---|
| *B29C 65/00* | (2006.01) |
| *B29C 65/18* | (2006.01) |
| *B31B 70/64* | (2017.01) |
| *B29L 31/00* | (2006.01) |

(52) U.S. Cl.
CPC ......... *B29C 66/8167* (2013.01); *B29C 65/18* (2013.01); *B29C 66/1122* (2013.01); *B29C 66/431* (2013.01); *B29C 66/8141* (2013.01); *B31B 70/642* (2017.08); *B29L 2031/712* (2013.01)

(58) Field of Classification Search
CPC ..... B29C 65/18; B29C 65/38; B29C 66/3452; B29C 66/81433; B29C 66/8167; B29C 66/8169; B29C 66/8141; B29C 66/81435; B29C 66/8412; B29C 66/84121; B29C 66/8165; B29C 66/843; B29C 66/849; B29C 66/8491; B29C 66/851; B29C 66/8511; B29C 66/1122; B29C 66/431; B31B 70/642; B65B 51/146; B65B 59/00; B65B 59/001; B65B 59/003; B65B 59/04; B29L 2031/712; B29L 2031/7128
USPC ..................................................... 156/583.91
See application file for complete search history.

(56) References Cited

U.S. PATENT DOCUMENTS

| | | | |
|---|---|---|---|
| 2,589,756 A | * | 3/1952 | Waters ................ B29C 66/8167 156/581 |
| 3,234,705 A | | 2/1966 | Schwartz |
| 4,134,245 A | | 1/1979 | Stella |
| 4,604,854 A | | 8/1986 | Andres |
| 4,693,058 A | | 9/1987 | Kovacs |
| 4,768,326 A | | 9/1988 | Kovacs |
| 4,837,849 A | | 6/1989 | Erickson et al. |
| 4,997,594 A | | 3/1991 | Woods |
| 5,547,284 A | | 8/1996 | Imer |
| 5,826,401 A | | 10/1998 | Bois |

(Continued)

FOREIGN PATENT DOCUMENTS

| | | |
|---|---|---|
| EP | 0253755 | 1/1988 |
| EP | 3191295 | 7/2017 |

*Primary Examiner* — John L Goff, II
(74) *Attorney, Agent, or Firm* — Kelly D Stephens; Matthew C Juren; Stephens Juren, PLLC (57) ABSTRACT

A set of sealing jaws incorporating an adjustable seal area to seal the vertical portion of a bottom gusseted style of package. An adjustable seal surface allows a packaging machine to run different film web widths without the need to change jaws. The sealing jaws to be converted to run bottom gusset packages to pillow packages without the requirement to change jaws.

13 Claims, 8 Drawing Sheets

(56) References Cited

U.S. PATENT DOCUMENTS

| | | | |
|---|---|---|---|
| 6,029,428 | A | 2/2000 | Terminella et al. |
| 6,691,491 | B2 | 2/2004 | Terminella et al. |
| 6,695,757 | B2 | 2/2004 | Edwards et al. |
| 2002/0147090 | A1 | 10/2002 | Kuge et al. |
| 2004/0023777 | A1 | 2/2004 | Ausnit |
| 2009/0260324 | A1 | 10/2009 | Funaki et al. |
| 2014/0161373 | A1 | 6/2014 | Yeager |
| 2016/0067937 | A1 | 3/2016 | Yeager et al. |
| 2016/0325518 | A1 | 11/2016 | Ishihara et al. |

\* cited by examiner

ADJUSTABLE SEALING BAR FOR PRE-APPLIED BOTTOM GUSSET PACKAGE AND METHOD OF USING THE SAME

CROSS-REFERENCE TO RELATED APPLICATIONS

This application claims priority to, U.S. Provisional App. 62/920,201 filed Apr. 19, 2019, titled "Adjustable Sealing Bar for Pre-Applied Bottom Gusset Package," the entire contents of which are hereby incorporated by reference.

STATEMENT REGARDING FEDERALLY SPONSORED RESEARCH

Not applicable.

BACKGROUND

The present invention generally relates to an adjustable sealing bar for pre-applied bottom gusset packaging and a method of using the same.

In general, vertical form fill and seal packaging (VFFS) machines are designed to convert a flat film web into a package shape, introduce a product into a package, and seal and cut the filled package from the film web. This shape is commonly referred to in the packaging industry as a "pillow pack". The top and bottom of the web is sealed as well as the overlapping edges of the film web in the back of the package forming a pillow shaped package.

Vertical form fill and seal ("VFFS") baggers are not specifically designed to create stand-up packages, and various methods have been invented to create stand-up packages on a VFFS packaging machine.

Generally, "bottom gusseting" is one such method to create stand up bags on a VFFS packaging machine and is entirely unique to some other methods (horizontal packaging, pouch making, or three-sided pouches) such as block bottom VFFS, Doy style stand up, or one-sided tuck VFFS packages. Bottom gusseted packages require two key components: a film web with a pre-applied gusset and a set of unique sealing jaws set to seal the film web and gusset. The combination of film web and sealing jaws creates a bottom gusseted package as shown, by way of example, as disclosed in U.S. Pat. No. 9,272,481.

Some VFFS packaging machines accept interchangeable tooling, specifically forming collars and sealing jaws. "Forming collars" are devices that created the final shape of the package by converting the flat film web into a tube-shaped package that is, in turn, filled with product to be packaged. Vertical (or back-seal) jaws are devices used to vertically seal the film web along the overlap of the two edges of the film web. Horizontal (or cross seal) jaws simultaneously seal the tops and bottom edges of the film web after the product is introduced into the package. Both the back-seal jaw set, and the cross-seal jaw set create a seal by utilizing heat sealing or ultrasonic sealing of the film web. In general applications, a cut-off knife and knife actuation mechanism is incorporated into the one jaw. The knife serves to cut the now filled package from the film web.

In some embodiments, the present invention addresses the horizontal cross seal jaw portion of bottom gusseted packages, specifically the upper vertical portion of the lower seal.

Many bottom gusseted sealing jaws have a vertical sealing area directly above the lower seal of a package. The vertical seal area creates a seal between the film web and the gusset, thereby welding the gusset to the film web. The welded seal between the film web and the gusset is one feature that makes bottom gusseting function. As known in the industry or art, the upper vertical seal area is termed the "goal post" seal area due to the similarity to a football field's goal post shape.

Due to the wide variety of products packaged on VFFS packaging machines, the final shape, size, and appearance of a bottom gusseted package can vary. Heavier, bulky products appear different than lighter, less dense products within the same package dimensions. In most instances, several trial runs with different film web/gusset combinations are required to achieve an acceptably shaped and functioning package per a user's requirements. Some present bottom gusseted jaw sets are designed for a single fixed film web/gusset size/bag width with no method for adjusting the goal post seal for different bag widths.

Creating many different film web/gusset combinations for trial runs can be costly, time-consuming and is often not effective for a user. A need exists to allow for adjustments of the goal post section of the cross-seal bars in order to fine-tune the shape and appearance of the package without changing film web/gusset combinations.

Additionally. VFFS packaging machine operators often run different bag sizes in regard to the width and length directions. An example can be found with snack food products, or salads, which tend to be packaged in different bag widths and lengths on the same VFFS packaging machines by removing and installing interchangeable tooling.

Sealing jaw changeovers on VFFS packaging machines is time-consuming and costly due to down-time. VFFS operators require a quick method of converting the VFFS machine from bottom gusseted operations to pillow pack operations without the time-consuming process of removing sealing jaws and replacing those jaws with a different jaw style.

The present invention is differentiated from the following prior art:

The present invention is distinguished from U.S. Pat. No. 9,272,481. The '481 patent addresses the package design only and does not address sealing. The present invention addresses the sealing of packages. There is no adjustability or interchangeability disclosed in the '481 patent.

The present invention is distinguished from US 2009/023032. The '032 patent application discloses a seal bar design to prevent seal defects. The '032 patent application does not disclose or claim adjustable seal bars. The '032 patent application does not disclose, or claim uses with bottom gusseted packages. There is no adjustability or interchangeability disclosed in the '032 patent application.

The present invention is distinguished from US 2016/0067937. The '937 application claims a jaw design with a removeable seal face "permitting formation of non-gusseted packages", yet the '937 application does not claim adjustable sealing jaws as is found in the present invention, and does not claim interchangeable seal jaw portions as found in the present invention. There is no adjustability or interchangeability disclosed in the '937 patent application.

The present invention is distinguished from US 2016/0325518. The '518 application is a patent application claiming a method for creating gusseted packages. Application '518 is not a bottom-gusseted application or invention, unlike the present invention. The '518 application makes no claims regarding sealing jaws. There is no adjustability or interchangeability disclosed in the '518 patent application.

The present invention is distinguished from U.S. Pat. No. 6,029,428. '428 is a patent for a vertical form fill seal packaging machine with a method of creating a resealable package by applying a longitudinal zipper. The machine of '428 is convertible to a standard pillow pack. There is no adjustability or interchangeability disclosed in the '428 patent.

The present invention is distinguished from U.S. Pat. No. 6,691,491. '491 is a patent for a vertical form fill seal packaging machine with a method of creating a resealable package by applying a longitudinal zipper. The machine of '491 is convertible to a standard pillow pack. There is no adjustability or interchangeability disclosed in the '491 patent.

The present invention is distinguished from U.S. Pat. No. 6,695,757. '757 discloses a design of a self-standing bag. This is not a form fill seal packaging application of the present invention. There is no adjustability or interchangeability disclosed in the '757 patent.

The present invention is distinguished from U.S. Pat. No. 6,795,932. '932 is a method of creating gusseted bags. This is not a form fill seal packaging application of the present invention. There is no adjustability or interchangeability disclosed in the '932 patent.

The present invention is distinguished from U.S. Pat. No. 5,826,401. '401 describes a method to create a gusseted bag on a form fill seal packaging machine in various positions. There is no adjustability or interchangeability disclosed in the '401 patent.

The present invention is distinguished from U.S. Pat. No. 4,768,326. '326 discloses a different method to achieve results similar to those of the '401 patent. The '326 patent does not apply to pre-applied bottom gusseted packages. The '326 patent does not claim adjustable bottom gusset seal bars, unlike the present invention. There is no adjustability or interchangeability disclosed in the '326 patent.

The present invention is distinguished from U.S. Pat. No. 4,837,849. The '849 patent discloses a standard "pouch" which is fundamentally created in a different manner than a pillow pack. The '849 patent describes a package design, but not the method or tooling to create it. There is no adjustability or interchangeability disclosed in the '849 patent.

U.S. Pat. No. 4,997,504 describes a method of creating a bottom gusseted pouch, but without a pre-applied bottom gusset. This also describes a method of using an electron beam to cure the film's sealant layer. The patent does not apply to pre-applied bottom gusseted packages. '504 does not claim adjustable bottom gusset seal bars. There is no adjustability or interchangeability disclosed in the '504 patent.

U.S. Pat. No. 5,547,284 describes a stand-up four-sided pouch design which expands into a side gusseted bag when filled with product. This is not a form, fill and seal application. The design does apply to a pre-applied bottom gusseted package. There is no adjustability or interchangeability disclosed in the '284 patent.

EP0253755A2B relates to sealing the fin seal of a non-gusseted package. This application applies to the fin seal area of a pillow pack, not to bottom-gusseted packages. The application does not claim adjustable gusset sealing jaws. This application does not claim interchangeable sealing jaws. This application does not apply to bottom-gusseted packages. There is no adjustability or interchangeability disclosed in the '755 application.

EP3191295B1 claims a removeable sealing jaw portion, but not an interchangeable jaw portion. This patent application does not appear to claim an adjustable bottom gusset seal jaw. This patent claims at least one removeable jaw portion for permitting formation of non-gusseted packages. There is no adjustability or interchangeability disclosed in the '955 application.

U.S. Pat. No. 3,223,805 applies to a method of sealing sterile bulky products within a package to ensure hermetic seals. This invention applies to gusseted packages. This invention does not apply to bottom-gusseted packages. This invention does not claim adjustable gusset sealing jaws. There is no adjustability or interchangeability disclosed in the '805 patent.

U.S. Pat. No. 4,134,245 claims a design for a horizontal form fill seal machine. Bottom-gusset packages are created on vertical form fill seal machines. This patent does not claim a gusseted package. This patent does not claim adjustable gusset sealing jaws. There is no adjustability or interchangeability disclosed in the '245 patent.

U.S. Pat. No. 4,604,854 applies to side-gusseted bags and methods of filling bags on a vertical form fill seal machine. This invention claims a formed gusset package, not a pre-applied bottom gusset. This invention does not claim adjustable bottom gusset sealing jaws. There is no adjustability or interchangeability disclosed in the '854 patent.

US 2016/0067937 teaches a pre-applied bottom gusset package form and the sealing technology for a removeable sealing face. The '937 patent application claims a removeable gusset seal face to allow the user to create standard non-gusseted packages. There is no adjustability or interchangeability disclosed in the '937 patent application.

U.S. Pat. No. 6,928,791 teaches a U-Shaped sealing technology. The '791 patent applies to sealing technology for forming re-closeable bags and does not address bottom gusseted packages. There is no adjustability or interchangeability disclosed in the '791 patent application.

In some prior art, FFS packaging machines are designed to run with cumbersome interchangeable tooling which typically is a forming collar which creates the final bag size and shape, in addition to sealing jaws which create the final package seals. Jaw change-over is a skill requiring technical knowledge. Typically, jaw changeovers are performed by trained maintenance personnel to ensure proper alignment and to prevent costly damage to the FFS equipment. Jaw changeovers are time consuming procedures requiring downtime of the FFS.

Prior art does not teach adjustable bottom gusset sealing jaws. Prior designs feature a fixed sealing jaw that can create a single bag width. Generally, bottom gusseted sealing jaws have a horizontal sealing function and a vertical side seal function. The horizontal portion of the sealing jaws creates a seal along the top and bottom of the package. The vertical portion of bottom gusseted jaws creates a vertical seal along the left and right sides of a package directly above the lower seal of a package. This vertical feature seals the pre-applied gusset to the film web which, in turn, creates a stand-up flat bottom package. The invention comprises a novel design and method of adjusting the vertical side seal portion of a bottom gusseted seal bar.

Some factors requiring interchangeable seal profiles include: a) product shape and density as well as the ability of a product to "settle" in a package that affects the final appearance of a bottom gusseted package; b) certain products that require hermetic seals to control the freshness of the product and extend the shelf life; c) requirements for printed bag graphics may require alteration of the package seal profile to ensure readability of bar codes, product weight, ingredients or other information, and the requirement to allow the manufacturer to change the volume of the bag for a given bag size.

SUMMARY

In some embodiments of the present invention, the present invention is generally an adjustable sealing bar for pre-applied bottom gusset packaging and a method of using the same. A bottom-gusseted package comprises a package body, and a bottom gusset positioned transversely of a longitudinal axis of the package body. A top sleeve portion of the package body can be configured to include a re-closeable fastener, a dispensing spout, or an upper package seal. Formation of the bottom-gusseted package is affected by positioning individual sleeves transversely of the longitudinal axis of a flexible web which forms the package body. During package formation, the flexible web is cut to form individual packages, and each individual sleeve can be cut to form a bottom gusset in one package, and a top sleeve portion in an adjacent package.

Bottom gusseted sealing jaws have a horizontal sealing function and a vertical side seal function. The horizontal portion of the sealing jaws creates a seal along the top and bottom of the package. The vertical portion of bottom gusseted jaws creates a vertical seal along the left and right sides of a package directly above the lower seal of a package. This vertical feature seals the pre-applied gusset to the film web which, in turn, creates a stand-up flat bottom package.

In several embodiments, the present invention comprises a novel design and method of adjusting the vertical side seal portion of a bottom gusseted seal bar.

In some embodiments of the present invention, a feature of the present inventive design that distinguishes an inventive method of the present invention from other sealing technology for bottom gusseted packages is adjustability and interchangeability. Prior art does not teach either of these inventive features.

In some embodiments of the present invention, adjustability is a feature that allows the side seals of a set of bottom gusseted sealing jaws to "fine tune" the final package appearance.

In some embodiments, the present invention creates an acceptable package on a form fill seal packaging machine ("FFS") which requires controlling numerous variables. The final packaged product requires the FFS operator to have the ability to make changes. In some embodiments, the present invention design allows the FFS operator to adjust the upper seals to achieve the desired results.

In several embodiments, the present invention provides for an adjustable seal face feature that allows the FFS operator to adjust the side gusset seals for varying bag widths without a time-consuming changeover. This is accomplished with simple hand tools with the sealing jaws mounted on the FFS packaging machine. An automatic alignment feature such as a key or rail maintains precise alignment in the vertical direction and prevents angular misalignment.

In several embodiments of the present invention, a pre-applied bottom gusset packaging film allows for an infinite variety of seal profiles. Interchangeability allows the FFS operator to create different geometric seal profiles.

In some embodiments, the present invention allows the FFS operator to adjust the side seals to allow variables such as (but not limited to) product shape, product density, packaging film variables, FFS repeatability, FFS operator skill, and production rate variables. An example of variable product shapes would include packaged products with varying shapes such as shrimp, meatballs, puffed or extruded snack foods, frangible products or chicken pieces.

In several instances, packaged product density can change due to upstream processes. This creates a variable in the package that can be adjusted by the FFS operator.

In some instances, packaging film properties vary due to film storage procedures, plant environments in the packaging area, and variations in film substrates such as barriers and sealant layers. In many instances, FFS operators have variating degrees of skill level. An operator must be able to control FFS production rates, sealing temperatures, sealing pressure, and final bag shape. In several embodiments of the present invention, the adjustable feature of the present design gives the FFS operator the ability to control the final packaged product.

In several embodiments of the present invention, the design allows the FFS operator to run different bag widths without the time-consuming process of sealing jaw changeover.

In several embodiments of the present invention, the design allows the FFS operator to interchange the side sealing profile with simple hand tools. An automatic alignment feature of the design allows the operator to precisely install and align interchangeable side seal inserts.

In some embodiments, the present invention has alignment features for the seal inserts which can be at variant angles in relationship to the bottom sealing surface.

Currently, jaw changeover requires the FFS operator to power down and lock out the machine controls for safety reasons. In turn, the hot sealing jaws must be allowed to cool to safely handle and remove the existing jaws. Only then can the new set of jaws be installed which require a skilled maintenance technician capable of aligning the new jaw set within less than 0.001 of an inch and then ensuring the electrical connections are safely connected and properly installed. Once installed, the FFS machine must be re-energized and re-started. The jaw changeover process described above could take from one to four hours per bagger. In some VFFS designs, the packaging machine is designed for quick jaw frame changeover requiring additional components that add to the cost of operation of the bagger. In some embodiments, the present invention solves at least (3) three issues related to fixed sealing profiles on bottom gusseted sealing jaws: a) adjustability for differences in packaged products, b) adjustability for different bag widths, c) a method to easily convert between bottom gusseted packages and standard (pillow) packages by eliminating time-consuming jaw changeovers. In several embodiments, the present invention addresses at least: a) adjustability for differences in packaged products; b) adjustability for different bag widths; c) adjustability for different bag shapes; d) the ability to easily convert between bottom gusseted packages and standard (pillow) packages by eliminating time-consuming jaw changeovers.

BRIEF DESCRIPTION OF THE DRAWINGS

For a more complete understanding of the present disclosure and the advantages thereof, reference is now made to the following descriptions to be taken in conjunction with the accompanying drawings describing specific embodiments of the disclosure, wherein.

DETAILED DESCRIPTION

One or more illustrative embodiments incorporating the invention disclosed herein are presented below. Applicant has created a revolutionary adjustable sealing bar and assembly for pre-applied bottom gusset package and method of using the same.

In the following description, certain details are set forth such as specific quantities, sizes, etc. to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing embodiments of the disclosure and are not intended to be limiting thereto. Drawings are not necessarily to scale and arrangements of specific units in the drawings can vary.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary 2018. Definitions and/or interpretations should not be incorporated from other patent applications, patents, or publications, related or not, unless specifically stated in this specification, or if the incorporation is necessary for maintaining validity.

Certain terms are used in the following description and claims to refer to system components. As one skilled in the art will appreciate, different persons may refer to a component by different names. This document does not intend to distinguish between components that differ in name, but not function. The drawings and figures are not necessarily to scale. Certain features of the invention may be shown exaggerated in scale or in somewhat schematic form, and some details of conventional elements may not be shown, all in the interest of clarity and conciseness.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

Figure 1:
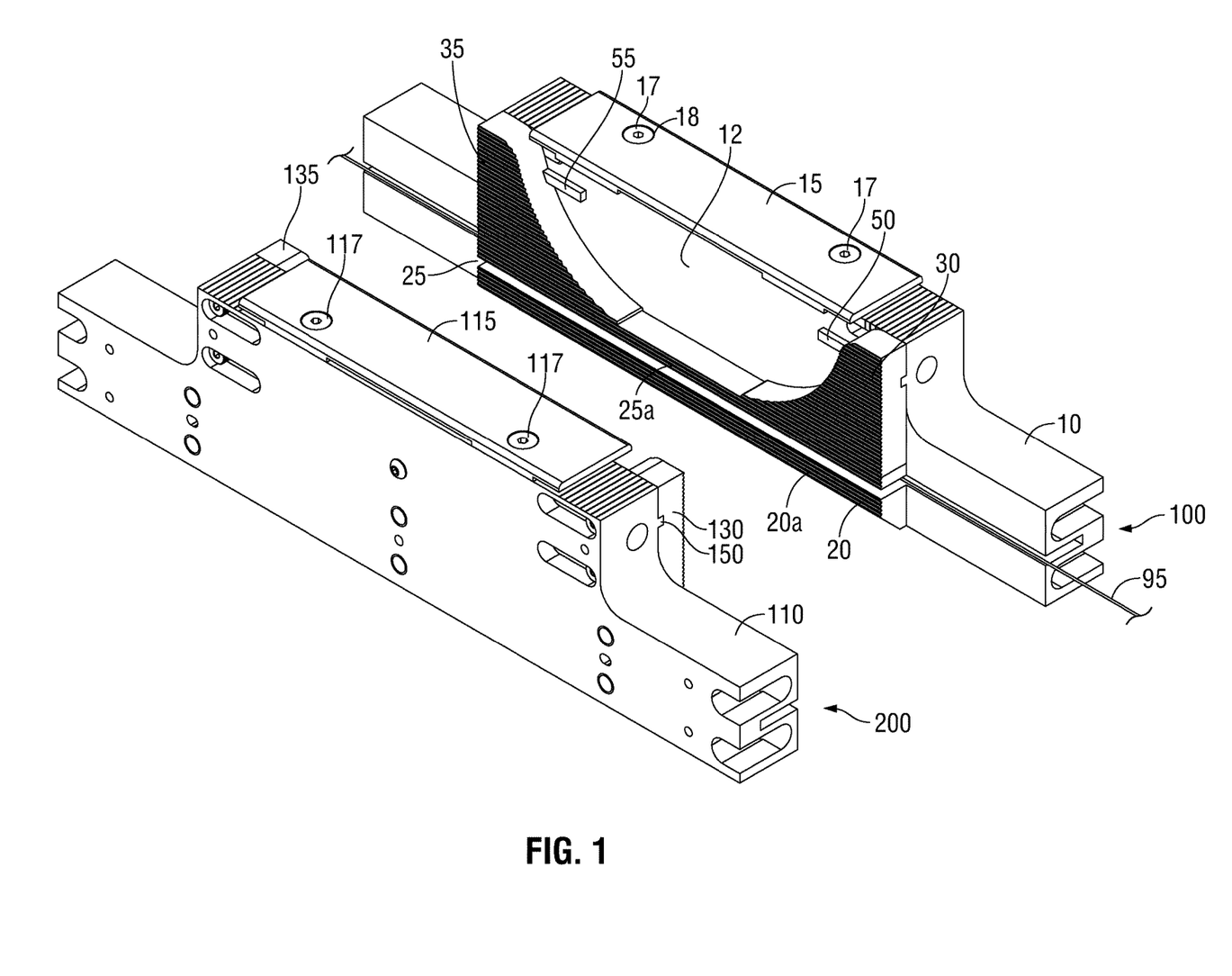
FIG. 1 is a partially assembled view of one embodiment of first and second sealing jaws of one embodiment of the present invention.

FIG. 1 is a partially assembled view of one embodiment of first and second sealing jaws of one embodiment of the present invention. With further reference to FIG. 1, the body of the first sealing jaw main assembly 100 can be mounted to jaw transport frames on a packaging machine. As illustrated, in some embodiments, first sealing jaw main assembly 100 can be constructed of a frame 10. Frame 10 can be comprised of any geometric shape for engaging a packing machine, and frame 10 can be comprised of materials such as metals, composites, or industrial plastics as used in the packaging industry.

In several embodiments, frame 10 has a concave interior 12 side with alignment extensions 50 and 55 on opposite ends of the concave interior 12 of frame 10. In several embodiments of the present invention, alignment extensions 50 and 55 act as guide rails for inserts 30 and 35. In some embodiments, the alignment extensions 50 and 55 are incorporated into frame 10 to prevent rotational and vertical misalignment of the inserts 30 and 35 during the sealing operation. Alignment extensions 50 and 55 can be constructed in any geometric shape capable of interfacing with inserts 30 and 35 (as well as insert base or sealing surface 25).

In several embodiments, frame 10 is constructed with an insert base 25 which is preferably located in the concave interior 12 and at distance below the extensions 50 and 55. In several embodiments, insert base 25 is constructed in any geometric shape capable of interfacing with inserts 30 and 35, as well as alignment extensions 50 and 55. In several embodiments of the present invention, alignment extensions 50 and 55 are integral to the frame 10 and actually fabricated from the frame 10 as one unit. In several embodiments, insert base 25 has a textured interior face 25a which is designed to interface with package in working operations. In some embodiments, located below and parallel to insert base 25 is top seal bar 20. In several embodiments, top seal bar 20 is constructed in any geometric shape. In several embodiments, top seal bar 20 has a textured interior face 20a which is designed to interface with package in working operations. In many embodiments, insert base 25 and top seal bar 20 are sealing surfaces that contact the film web during the sealing operation. These surfaces form respectively the bottom seal of the bag being filled (the top bag) and the horizontal top seal of the package already filled (the bottom bag). These surfaces are coplanar and coincident with insert sealing surfaces. In some embodiments, the insert base 25 top surface can be the top edge of the bottom seal of a package. The lower edge of insert 30, 35, 130, 135, 230 or 235 (See FIG. 8) contacts top surface of insert base 25 to maintain sealing integrity.

Further illustrated in FIG. 1 is attachable insulator 15 designed to prevent melting or burning the film web when the sealing jaws are closed. In some embodiments, insulator 15 is constructed in any geometric shape capable of interfacing with the top of frame 10. In some embodiments, the insulator 15 can be attached to the frame 10 through orifices 18 and screws 17.

Further illustrated in FIG. 1 is second sealing jaw main assembly 200. As illustrated, in some embodiments, second sealing jaw main assembly can be constructed of a frame 110. Frame 110 can be comprised of any geometric shape for engaging a packing machine and frame 110 can be comprised of materials such as metals, composites, or industrial plastics as used in the packaging industry. In several embodiments, second sealing jaw main assembly 200 is the mirror assembly of first sealing jaw main assembly 100, such that in operation the two sealing jaw main assemblies can interface with each other and seal a package by means of direct peak and valley contact of the serrated surfaces with the opposite jaw serrated surfaces, thereby creating a seal in the film web. In some embodiments, the seal surface could be comprised of any geometric shape that causes the film web to compress. In other embodiments, the seal surface could be comprised of any geometric shape that causes the film web to compress and become heated.

In several embodiments, frame 110 has a concave interior 112 side (not shown) with alignment extensions 150 and 155 (not shown) on opposite ends of the concave interior 112 of frame 110. In several embodiments of the present invention, alignment extensions 150 and 155 act as guide rails for inserts 130 and 135. Alignment extensions 150 and 155 can be constructed in any geometric shape capable of interfacing with inserts 130 and 135, as well as insert base or sealing surface 125 (not shown).

In several embodiments, frame 110 is constructed with an insert base 125 which is preferably located in the concave interior 112 and at distance below the alignment extensions 150 and 155. In several embodiments, insert base 125 is constructed in any geometric shape capable of interfacing with inserts 130 and 135, as well as alignment extensions 150 and 155. In several embodiments, insert base 125 has a textured interior face 125a which is designed to interface with package in working operations. In some embodiments, located below and parallel to insert base 125 is top seal bar 120. In several embodiments, top seal bar 120 is constructed in any geometric shape. In several embodiments, top seal bar 120 has a textured interior face 120a which is designed to interface with package in working operations.

Further illustrated in FIG. 1 is attachable insulator 115. In some embodiments, insulator 115 is constructed in any geometric shape capable of interfacing with the top of frame 110. In some embodiments, the insulator 115 can be attached to the frame 110 through orifices 118 (See FIG. 2) and screws 117.

Figure 3:
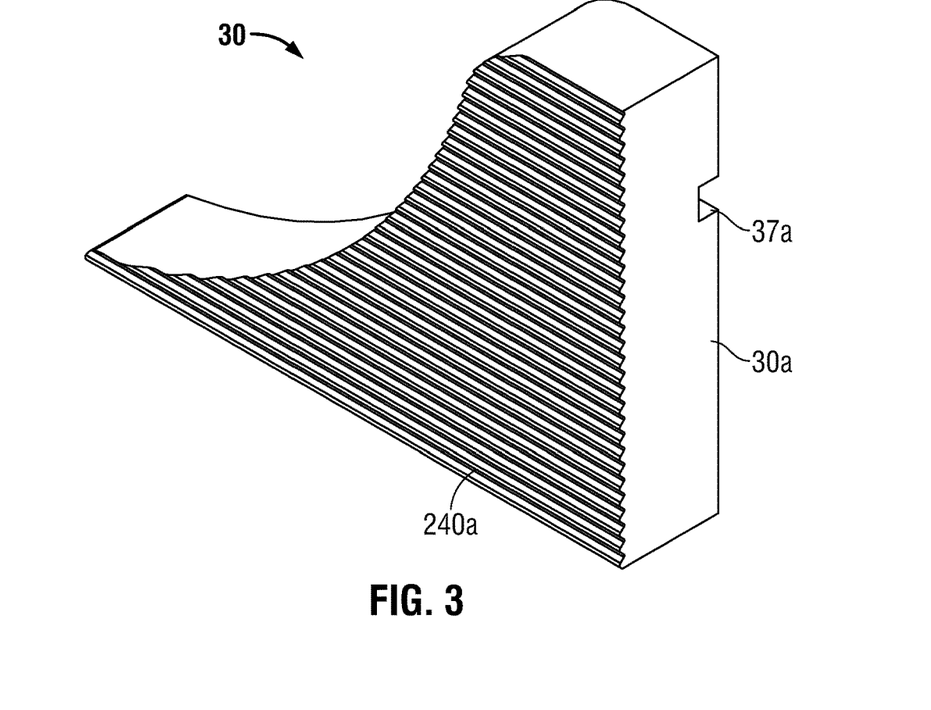
FIG. 3 is a partial side view of one sealing insert of one embodiment of the present invention.
Figure 4:
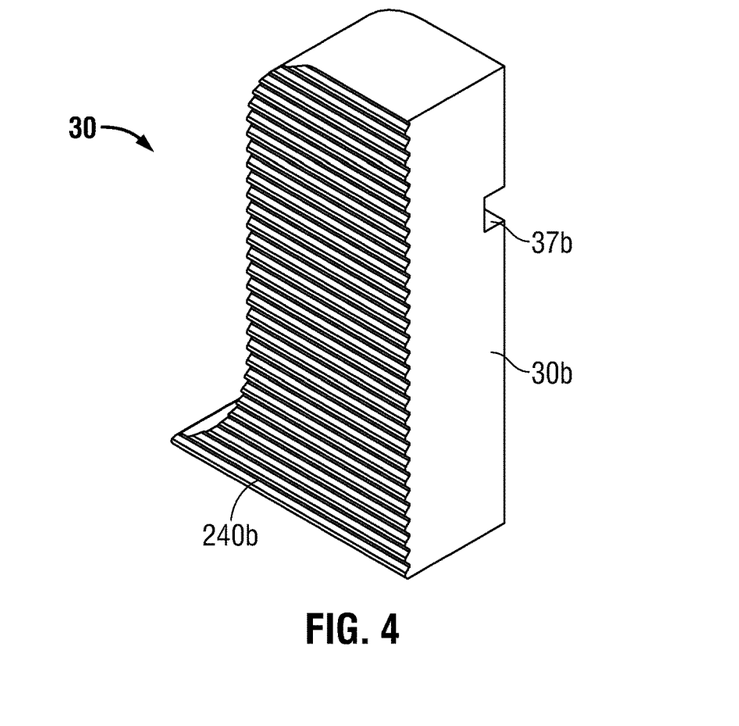
FIG. 4 is a partial side view of one sealing insert of one embodiment of the present invention.

In several embodiments, inserts 30, 35, 130 and 135 can be of variant geometric shape, however, in some embodiments the shape is of a 3-dimension descending curve with a patterned or textured front face 240a or 240b and a wedge back cut out 37a or 37b for interfacing with alignment extensions 50, 55, 150 or 155 respectively (FIGS. 3 and 4). In several embodiments, inserts 30, 35, 130 and 135 can be comprised of materials such as metals, composites, or industrial plastics as used in the packaging industry. In several embodiments, the inserts 35 and 135 are referenced as left-handed and inserts 30 and 130 are referenced as right-handed. In several embodiments, in order for the inventive sealing jaw to function, it requires a left-hand and right-hand insert. In several embodiments, inserts 30, 35, 130, and 135 are affixed to the frames 10 and 110 by a method that securely and accurately positions the inserts 30, 35, 130, and 135 during the sealing operation of the bottom gusseted package.

Figure 2:
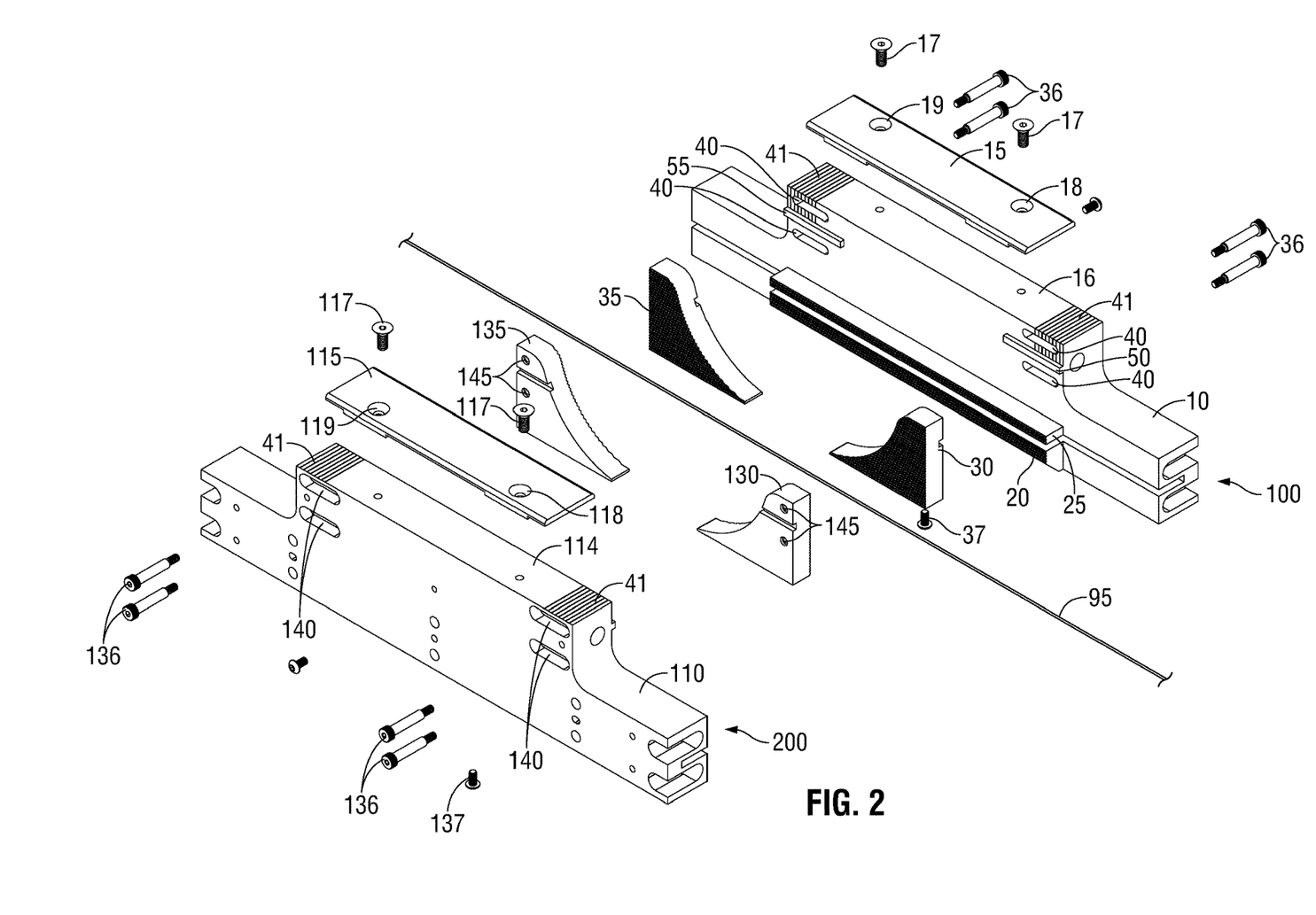
FIG. 2 is an exploded view of one embodiment of the first and second sealing jaws of the present invention.

FIG. 2 is an exploded view of one embodiment of the first and second sealing jaws of the present invention. With further reference to FIG. 2, the body of the first sealing jaw main assembly 100 can be mounted to jaw transport frames on a packaging machine. As illustrated, in some embodiments, first sealing jaw main assembly 100 can be constructed of a frame 10. Frame 10 can be comprised of any geometric shape for engaging a packing machine and frame 10 can be comprised of materials such as metals, composites, or industrial plastics as used in the packaging industry.

In several embodiments, frame 10 has a concave interior 12 side with alignment extensions 50 and 55 on opposite ends of the concave interior 12 of frame 10. In several embodiments of the present invention, alignment extensions 50 and 55 act as guide rails for inserts 30 and 35. Alignment extensions 50 and 55 can be constructed in any geometric shape capable of interfacing with inserts 30 and 35 (as well as insert base 25).

In several embodiments, frame 10 is constructed with an insert base 25, which is preferably located in the concave interior 12 and at distance below the alignment extensions 50 and 55. In several embodiments, insert base 25 is constructed in any geometric shape capable of interfacing with inserts 30 and 35, as well as extensions 50 and 55. In several embodiments, insert base 25 has a textured interior face 25a (See FIG. 1) which is designed to interface with package in working operations. In some embodiments, located below and parallel to insert base 25 is top seal bar 20. In several embodiments, top seal bar 20 is constructed in any geometric shape. In several embodiments, top seal bar 20 has a textured interior face 20a (See FIG. 1) which is designed to interface with package in working operations.

In several embodiments, a knife is run in the groove between the insert base 25 and the top seal bar 20, separating the top of a previously filled and sealed bag and the bottom of the bag between the main sealing jaw assemblies.

Further illustrated are slots 40 that are on the interior of frame 10 as well as pins 36, which in some embodiments of the present invention can be placed through slots 40 and mechanically attached to inserts 30 or 35, therein screwing the inserts 30 or 35 into communication with frame 10. In several applications, pins 36 can slidably move about slots 40 provided that they are not tightened sufficiently to inserts 30 or 35. Inserts 130 and 135 mirror inserts 30 and 35 and visibly demonstrate the screw pin orifices 140 in which pins 136 (and for inserts 30 and 35 pins 36) can mechanically attach to the inserts 130 and/or 135.

Further illustrated in FIG. 2 is attachable insulator 15. In some embodiments, insulator 15 is constructed in any geometric shape capable of interfacing with the top of frame 10. In some embodiments, the insulator 15 can be attached to the frame 10 through orifices 18 and screws 17.

Further illustrated in FIG. 2 is second sealing jaw main assembly 200. As illustrated, in some embodiments, first jaw main assembly can be constructed of a frame 110. Frame 110 can be comprised of any geometric shape for engaging a packing machine and frame 110 can be comprised of materials such as metals, composites, or industrial plastics as used in the packaging industry.

In several embodiments, second jaw main assembly 200 is the mirror assembly of first jaw main assembly 100 such that in operation the two jaw main assemblies can interface with each other and seal a package. As further illustrated, in some embodiments of the present invention, alignment hash lines 41 provide for visual indication of the position of the left-hand inserts 35 and 135, and the right-hand inserts 30 and 130 during setup and adjustment period for placement of the inserts.

In several embodiments, frame 110 has a concave interior 112 side (not shown) with alignment extensions 150 and 155 (not shown) on opposite ends of the concave interior 112 of frame 110. In several embodiments of the present invention, alignment extensions 150 and 155 act as guide rails for inserts 130 and 135. Alignment extensions 150 and 155 can be constructed in any geometric shape capable of interfacing with inserts 130 and 135 (as well as insert base 125).

In several embodiments, frame 110 is constructed with an insert base 125 (not shown on drawing), which is preferably located in the concave interior 112 and at distance below the alignment extensions 150 and 155. In several embodiments, insert base 125 is constructed in any geometric shape capable of interfacing with inserts 130 and 135, as well as alignment extensions 150 and 155. In some embodiments, the edge profile, or curve, of the inserts 30, 35, 130, or 135 is the interior edge of the vertical portion of the package seal, and is just but one of numerous sealing profiles that can be created on a bottom gusseted package. In several embodiments, insert base 125 has a textured interior face 125a which is designed to interface with package in working operations. In some embodiments, located below and parallel to insert base 125 is top seal bar 120. In several embodiments, top seal bar 120 is constructed in any geometric shape. In several embodiments, top seal bar 120 has a textured interior face 120a which is designed to interface with package in working operations.

Further illustrated in FIG. 2 is attachable insulator 115. In some embodiments, insulator 115 is constructed in any geometric shape capable of interfacing with the top of frame 110. In some embodiments, the insulator 115 can be attached to the frame 110 through orifices 118 and by inserting screws 117.

FIGS. 3 and 4 show partial side views of some inserts of some embodiments of the present invention. In several embodiments, inserts 30, 35, 130 and 135 can be of variant geometric shape, however, in some embodiments, the shape is of a 3-dimension descending curve with a patterned or textured front face 40a or 40b and a wedge back cut out 37a or 37b for interfacing with extensions 50, 55, 150 or 155, respectively (FIGS. 3 and 4). In several embodiments, inserts 30, 35, 130 and 135 can be comprised of materials such as metals, composites, or industrial plastics as used in the packaging industry.

As illustrated, inserts 30, 35, 130 and 135 can be of variant geometric shape, however, in some embodiments, the shape is of a 3-dimension descending curve with a patterned or textured front face 240a or 240b and a wedge back cut out 37a or 37b for interfacing with alignment extensions 50, 55, 150 or 155, respectively. In several embodiments, inserts 30, 35, 130 and 135 can be comprised of materials such as metals or composites, as used in the packaging industry.

Figure 5A:
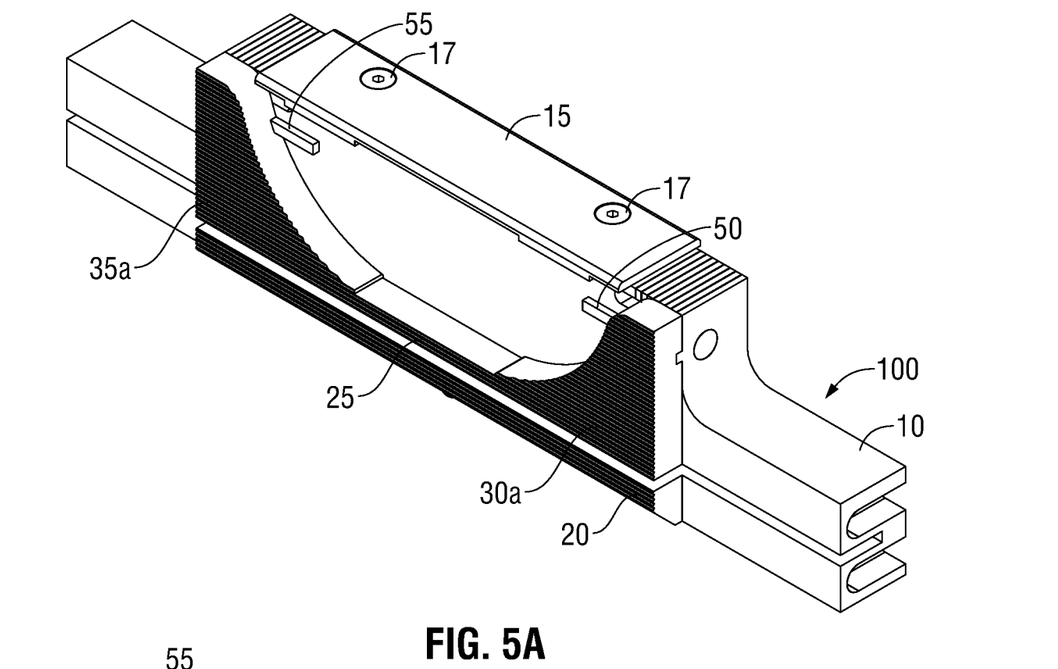
FIG. 5A is partial side view of one embodiment of the first sealing jaw of the present invention with one set of sealing inserts at an extended position.

FIG. 5A is partial side view of one embodiment of the first sealing jaw assembly of the present invention with one set of inserts at an extended position relative to each other. As illustrated, inserts 35a and 30a are attached to base 10 and rest upon insert base 25. As illustrated, inserts 35a and 30a are at a position extended away from each other as indicated by the distance of insert base 25 between the two inserts 35a and 30a that is open and not touching the inserts 35a and 30a. As further illustrated, more of the alignment extensions 55 and 50 are shown interior to the inserts 30a and 35a. In this position, if a package is made, it will be at one of the widest positions for a package in the horizontal plane. In several embodiments, insert base 25 is fabricated out of base 10 as a single unit. In several embodiments, insert base 25 is attached to base 10 as a separate unit.

Figure 5B:
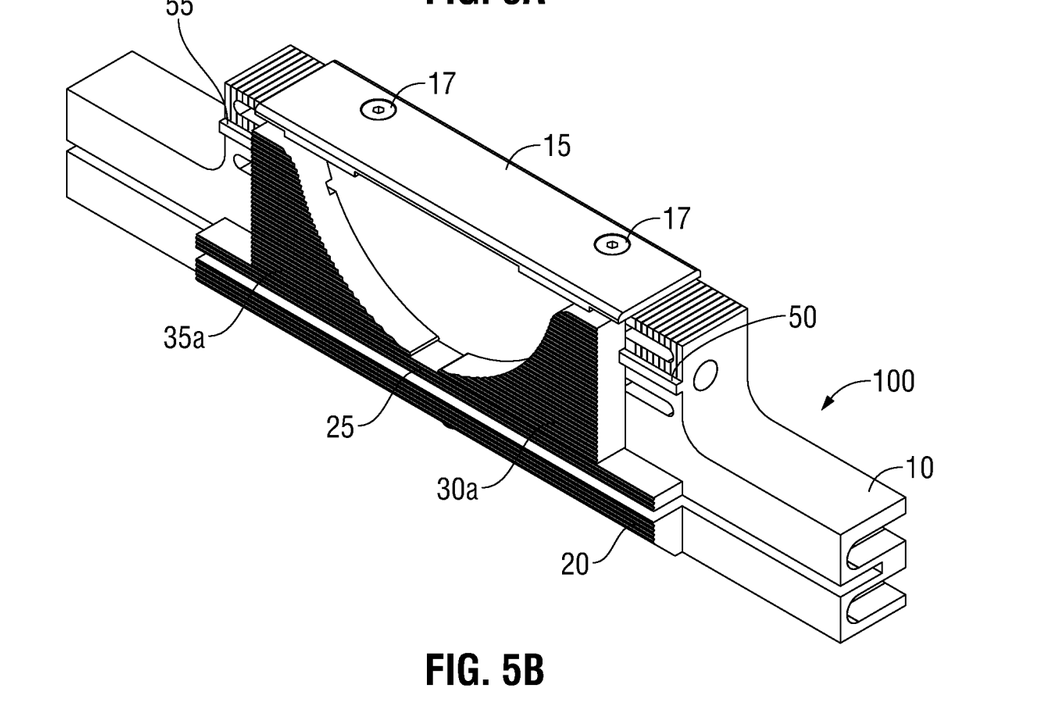
FIG. 5B is partial side view of one embodiment of the first sealing jaw of the present invention with one set of sealing inserts at a contracted position.

FIG. 5B is partial side view of one embodiment of the first sealing jaw assembly of the present invention with one set of inserts at a closer position relative to each other. As illustrated, inserts 35a and 30a are attached to base 10 and rest upon insert base 25. As illustrated, inserts 35a and 30a are at a position to each other as indicated by the distance of insert base 25 between the two inserts 35a and 30a that is open and not touching the inserts 35a and 30a. As further illustrated, none of the alignment extensions 55 and 50 are shown interior to the inserts 30a and 35a. In this position, if a package is made, it will be at one of the narrowest positions for a package.

Figure 6A:
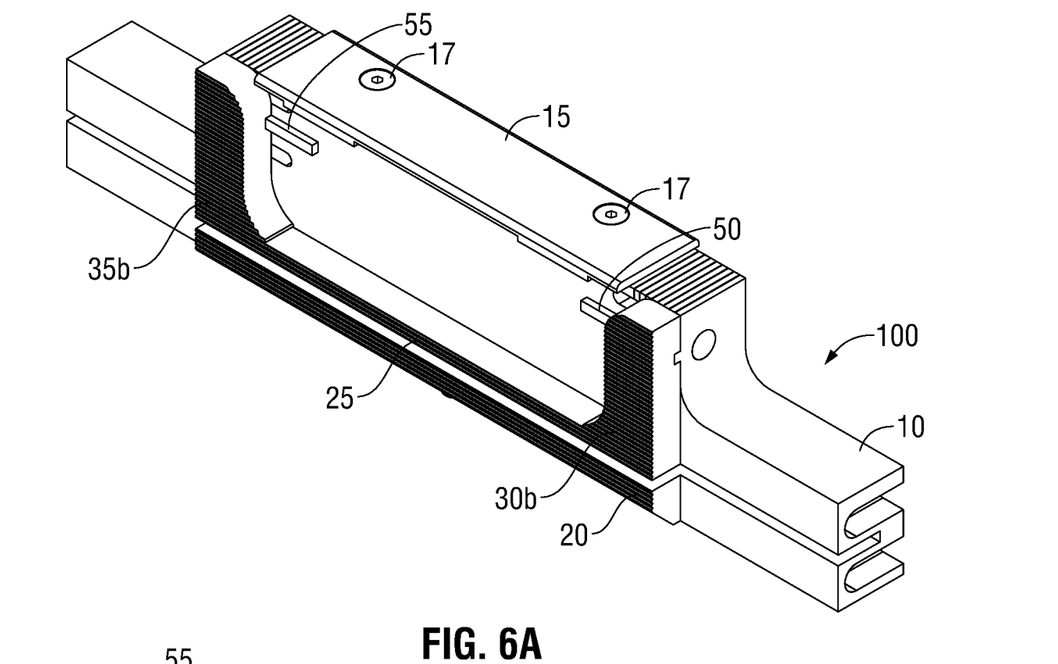
FIG. 6A is partial side view of one embodiment of the first sealing jaw of the present invention with one set of sealing inserts at an extended position.

FIG. 6A is partial side view of one embodiment of the first sealing jaw assembly of the present invention with one set of inserts 35b and 30b at an extended position. As illustrated, inserts 35b and 30b are attached to base 10 and rest upon insert base 25. As illustrated, inserts 35b and 30b are at a position extended away from each other as indicated by the distance of insert base 25 between the two sealing inserts 35b and 30b that is open and not touching the inserts 35b and 30b. As further illustrated, more of the alignment extensions 55 and 50 are shown interior to the inserts 30b and 35b. In this position, if a package is made, it will be at one of the widest positions for a package.

Figure 6B:
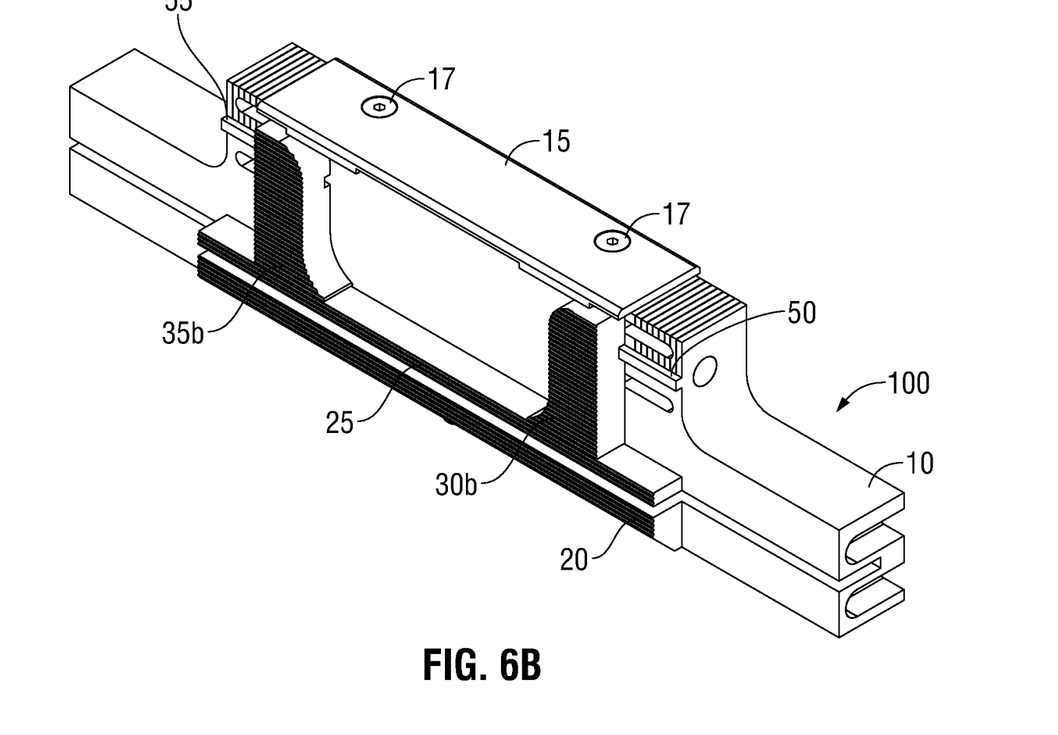
FIG. 6B is partial side view of one embodiment of the first sealing jaw of the present invention with one set of sealing inserts at a contracted position.

FIG. 6B is partial side view of one embodiment of the first sealing jaw assembly of the present invention with one set of inserts 35b and 30b at a closer position. As illustrated, inserts 35b and 30b are attached to base 10 and rest upon insert base 25. As illustrated, inserts 35b and 30b are at a position to each other as indicated by the distance of insert base 25 between the two inserts 35b and 30b that is open and not touching the inserts. As further illustrated, none of the alignment extensions 55 and 50 are shown interior to the inserts 35b and 30b. In this position, if a package is made, it will be at one of the narrowest positions for a package.

Figure 7:
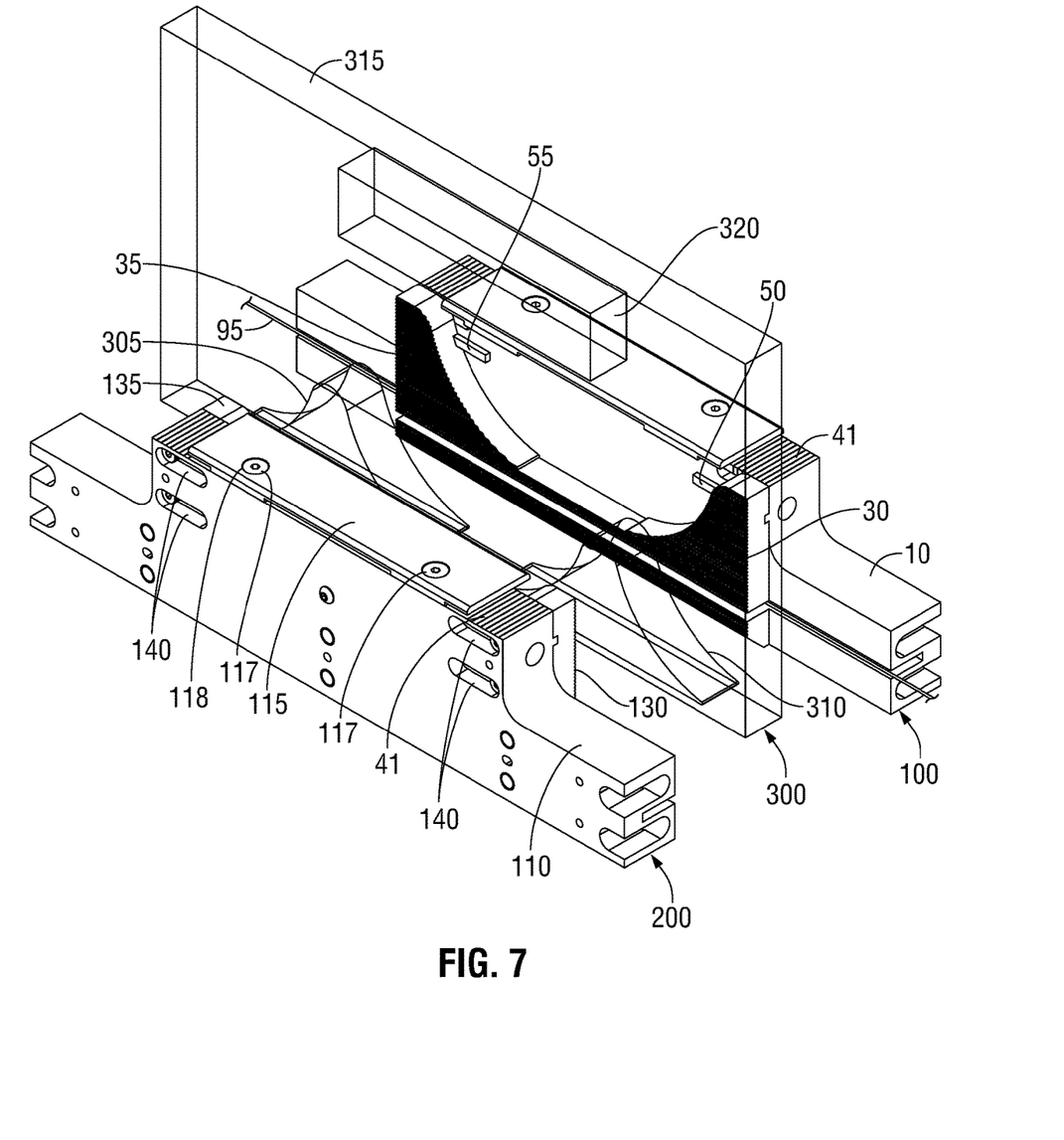
FIG. 7 is a partially assembled view of one embodiment of first and second sealing jaw of one embodiment of the present invention with a sealing block.

FIG. 7 is a partially assembled view of one embodiment of first and second sealing jaw assemblies of one embodiment of the present invention. With further reference to FIG. 7, the body of the first sealing jaw main assembly 100 can be mounted to jaw transport frames on a packaging machine. As illustrated, in some embodiments, first sealing jaw main assembly can be constructed with a frame 10. Frame 10 can be comprised of any geometric shape for engaging a packing machine, and frame 10 can be comprised of materials such as metals, composites, or industrial plastics as used in the packaging industry.

In several embodiments, frame 10 has a concave interior 12 side with alignment extensions 50 and 55 on opposite ends of the concave interior 12 of frame 10. In several embodiments of the present invention, alignment extensions 50 and 55 act as guide rails for inserts 30 and 35. Alignment extensions 50 and 55 can be constructed in any geometric shape capable of interfacing with inserts 30 and 35 (as well as insert base 25).

In several embodiments, frame 10 is constructed with an insert base 25 (See FIG. 1 for insert base 25 and textured interior face 25a) which is preferably located in the concave interior 12 and at a distance below the extensions 50 and 55. In several embodiments, insert base 25 is constructed in any geometric shape capable of interfacing with inserts 30 and 35, as well as alignment extensions 50 and 55. In several embodiments, insert base 25 has a textured interior face 25a which is designed to interface with package in working operations. In some embodiments, located below and parallel to insert base 25 is top seal bar 20. In several embodiments, top seal bar 20 is constructed in any geometric shape. In several embodiments, top seal bar 20 has a textured interior face 20a which is designed to interface with package in working operations. (See FIG. 1).

Further illustrated in FIG. 7 is attachable insulator 15 (see FIG. 1). In some embodiments, insulator 15 is constructed in any geometric shape capable of interfacing with the top of frame 10. In some embodiments, the insulator 15 can be attached to the frame 10 through orifices 18 and screws 17 (see FIGS. 1 and 2).

Further illustrated in FIG. 7 is second jaw main assembly 200. As illustrated, in some embodiments, second jaw main assembly 200 can be constructed of a frame 110. Frame 110 can be comprised of any geometric shape for engaging a packing machine, and frame 110 can be comprised of materials such as metals, composites, or industrial plastics as used in the packaging industry. In several embodiments, second jaw main assembly 200 is the mirror assembly of first jaw main assembly 100, such that in operation the two assemblies can interface with each other and seal a package.

In several embodiments, frame 110 has a concave interior 112 side (not shown) with alignment extensions 150 and 155 (not shown) on opposite ends of the concave interior 112 of frame 110. In several embodiments of the present invention, alignment extensions 150 and 155 act as guide rails for inserts 130 and 135. Alignment extensions 150 and 155 can be constructed in any geometric shape capable of interfacing with inserts 130 and 135 (as well as insert base 125).

As shown in FIGS. 1 and 2, frame 110, insert base 125, concave interior 112, alignment extensions 150 and 155, insert base 125, inserts 130 and 135, top seal bar 120 and its textured interior face 120a are respectively opposing copies of frame 10, insert base 25, concave interior 12, alignment extensions 50 and 55, insert base 25, inserts 30 and 35, top seal bar 20 and its textured interior face 20a. In several embodiments, frame 110 is constructed with an insert base 125 which is preferably located in the concave interior 112 and at distance below the alignment extensions 150 and 155. In several embodiments, insert base 125 is constructed in any geometric shape capable of interfacing with inserts 130 and 135, as well as alignment extensions 150 and 155. In several embodiments, insert base 125 has a textured interior face 125a which is designed to interface with package in working operations. In some embodiments, located below and parallel to insert base 125 is top seal bar 120. In several embodiments, top seal bar 120 is constructed in any geometric shape. In several embodiments, insert guide 120 has a textured interior face 120a which is designed to interface with package in working operations.

Further illustrated in FIG. 7 is attachable insulator 115. In some embodiments, insulator 115 is constructed in any geometric shape capable of interfacing with the top of frame 110. In some embodiments, the insulator 115 can be attached to the frame 110 through orifices 118 and screws 117.

In several embodiments, inserts 30, 35, 130 and 135 can be of variant geometric shape, however, in some embodiments, the shape is of a 3-dimension descending curve with a patterned or textured front face 240a or 240b and a wedge back cut out 37a or 37b for interfacing with alignment extensions 50, 55, 150 or 155, respectively (FIGS. 3 and 4). In several embodiments, inserts 30, 35, 130 and 135 can be comprised of materials such as metals, composites, or industrial plastics as used in the packaging industry.

As shown in FIG. 7, are components sealing block assembly bag 300, bag wedges 305 and 310, sealing block bag 315 and tray bag 320.

In several embodiments, the present invention is a sealing jaw assembly device comprising; first sealing jaw main assembly 100 comprising; first frame 10, first and second inserts 30 and 35, and first lower insert base or sealing bar 25; said first frame 10 further comprising first and second adjustment slots 40; said first frame 10 further comprising a first set of pins 36 to secure the first and second inserts 30 and 35 to the frame 10 through the first and second adjustment slots 40; said first frame 10 further comprising a first lower insert base or insert base 25 mechanically attached to the first frame 10; wherein said first and second inserts 30 and 35 engage said first frame 10 about said first and second adjustment slots 40, such that said inserts 30 and 35 are secured about said first frame 10 by the first set of pins 36 through said first and second adjustment slots 40; wherein first and second inserts 30 and 35 are moveable in relationship to each other about said first and second adjustment slots 40; second sealing jaw main assembly 200 comprising; second frame 110, third and fourth inserts 130 and 135, and second lower sealing bar 125; said second frame 110 further comprising third and fourth adjustment slots 140; said second frame 110 further comprising a second set of pins 136 to secure the third and fourth inserts 130 and 135 to the second frame 110 through the third and fourth adjustment slots 140; said second frame 110 further comprising a second lower sealing bar 125 mechanically attached to the second frame 110; wherein said third and fourth inserts 130 and 135 engage said second frame 110 about said third and fourth adjustment slots 140 such that said inserts 130 and 135 are secured about said second frame 110 by the second set of pins 136 through said third and fourth adjustment slots 140; wherein said third and fourth inserts 130 and 135 are moveable in relationship to each other about said third and fourth adjustment slots 140. In several embodiments, the first, second, third and fourth inserts 30, 35, 130, 135 may be interchanged with another set of fifth, sixth, seventh and eighth inserts (Reference FIGS. 3 and 4 for examples of such variant shapes 40a and 40b) with varying geometric shapes; wherein each first, second, third, fourth, fifth, sixth, seventh and eighth inserts 30, 35, 130, 135, 40a and 40b may be exchanged without the disassembly of the sealing jaw assembly. In several embodiments, the first, second, third and fourth inserts 30, 35, 130, 135, are heated. In several embodiments, the lower sealing bar 25 is heated. In several embodiments, said first, second, third and fourth inserts 30, 35, 130, 135 have an engagement face which may be comprised of varying geometric shapes or designs. In several embodiments, the distance between the first and second, and the third and fourth inserts 30, 35, 130, 135 is adjustable. In several embodiments, the shape of the seal is changed by interchanging said first, second, third and fourth inserts 30, 35, 130, 135 with varying insert shapes and sizes 40a and 40b. In several embodiments, there is only a first adjustment slot 40.

In several embodiments, the present invention is a method for creating a seal comprising the steps of; obtaining a first sealing jaw main assembly 100 comprising; first frame 10, first and second inserts 30 and 35, and a first lower sealing bar 25; said first frame further comprising a first adjustment slot 40; said first frame further comprising a first set of pins 36 to secure the first and second inserts 30 and 35 to the frame through said first adjustment slot 40; first sealing jaw main assembly 100 comprising; first frame 10, first and second inserts 30 and 35, and a first lower sealing bar 25; said first frame 10 further comprising a first adjustment slot 40; said first frame 10 further comprising a first set of pins 36 to secure the first and second inserts 30 and 35 to the first frame 10 through said first adjustment slot 40; said first frame 10 further comprising a first lower sealing bar 25 mechanically attached to the first frame 10; wherein said inserts 30 and 35 engage said first frame 10 about said first adjustment slot 40, such that said inserts 30 and 35 are secured about said first frame 10 by the first set of pins 36 through said first adjustment slot 40; wherein first and second inserts 30 and 35 are moveable in relationship to each other about said first adjustment slot 40; second sealing jaw main assembly 200 comprising a said second frame 110 further comprising a second adjustment slot 140; said second frame 110 further comprising a second set of pins 136 to secure the third and fourth inserts 130 and 135 to the second frame 110 through said second adjustment slot 140; said second frame 110 further comprising a second lower sealing bar 125 mechanically attached to the second frame 110; wherein said third and fourth inserts 130 and 135 engage said second frame 110 about said second adjustment slot 140 such that said inserts 130 and 135 are secured about said second frame 110 by the second set of pins 136 through said second adjustment slot 140; obtaining material for sealing; placing the sealing material between said first and second sealing jaw main assemblies 100 and 200, compressing said first and second sealing jaw main assemblies on said sealing material and applying heat to the first, second, third and fourth inserts 30, 35, 130 and 135, creating a seal on said sealing material; placing the sealing material between said first and second sealing jaw main assemblies 100 and 200, compressing said first and second sealing jaw main assemblies 100 and 200 on said sealing material and applying heat to the first, second, third and fourth inserts 30, 35, 130 and 135 creating a seal on said sealing material.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

Figure 8:
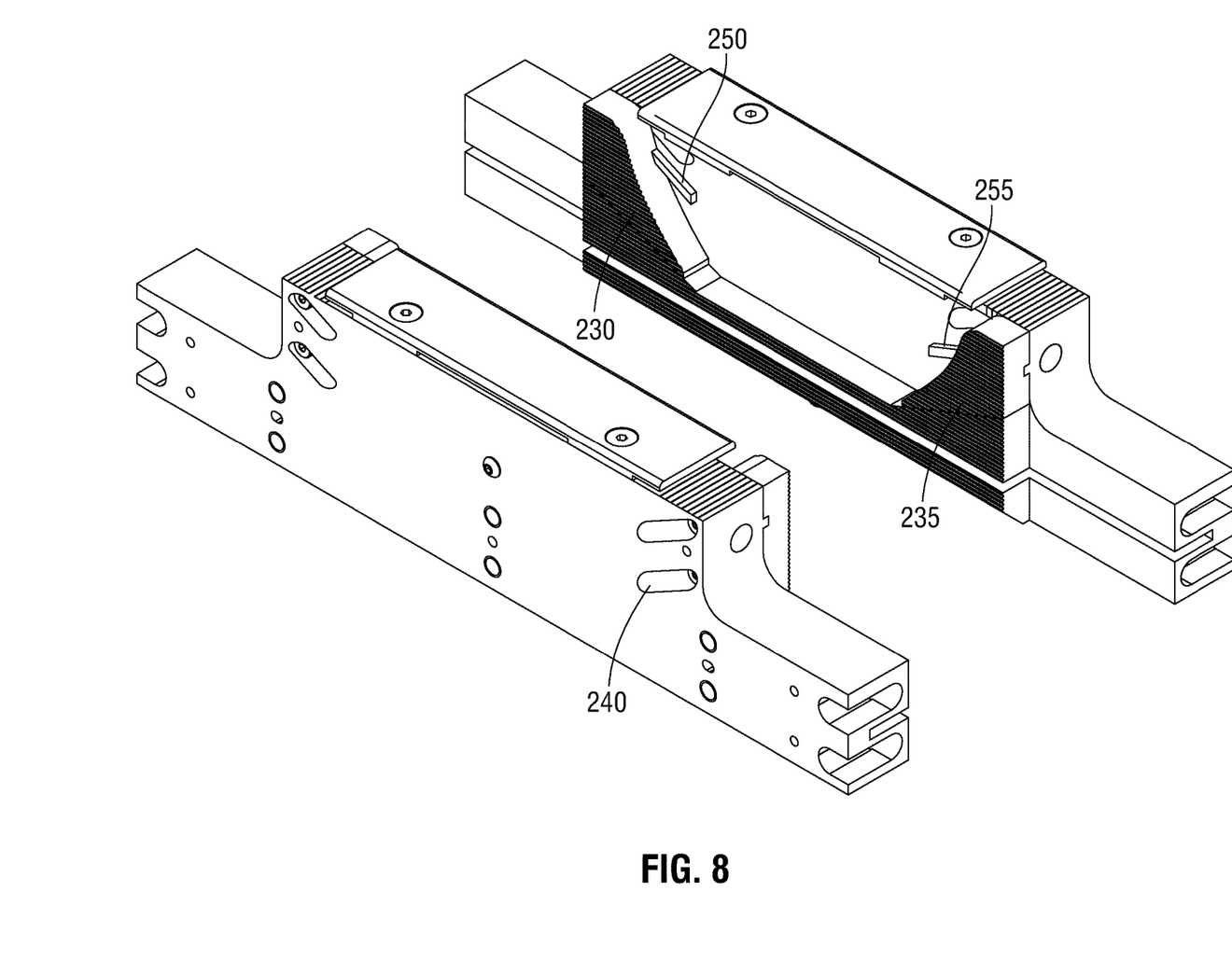
FIG. 8 is a partially assembled view of another embodiment of first sealing jaw.
Figure 9:
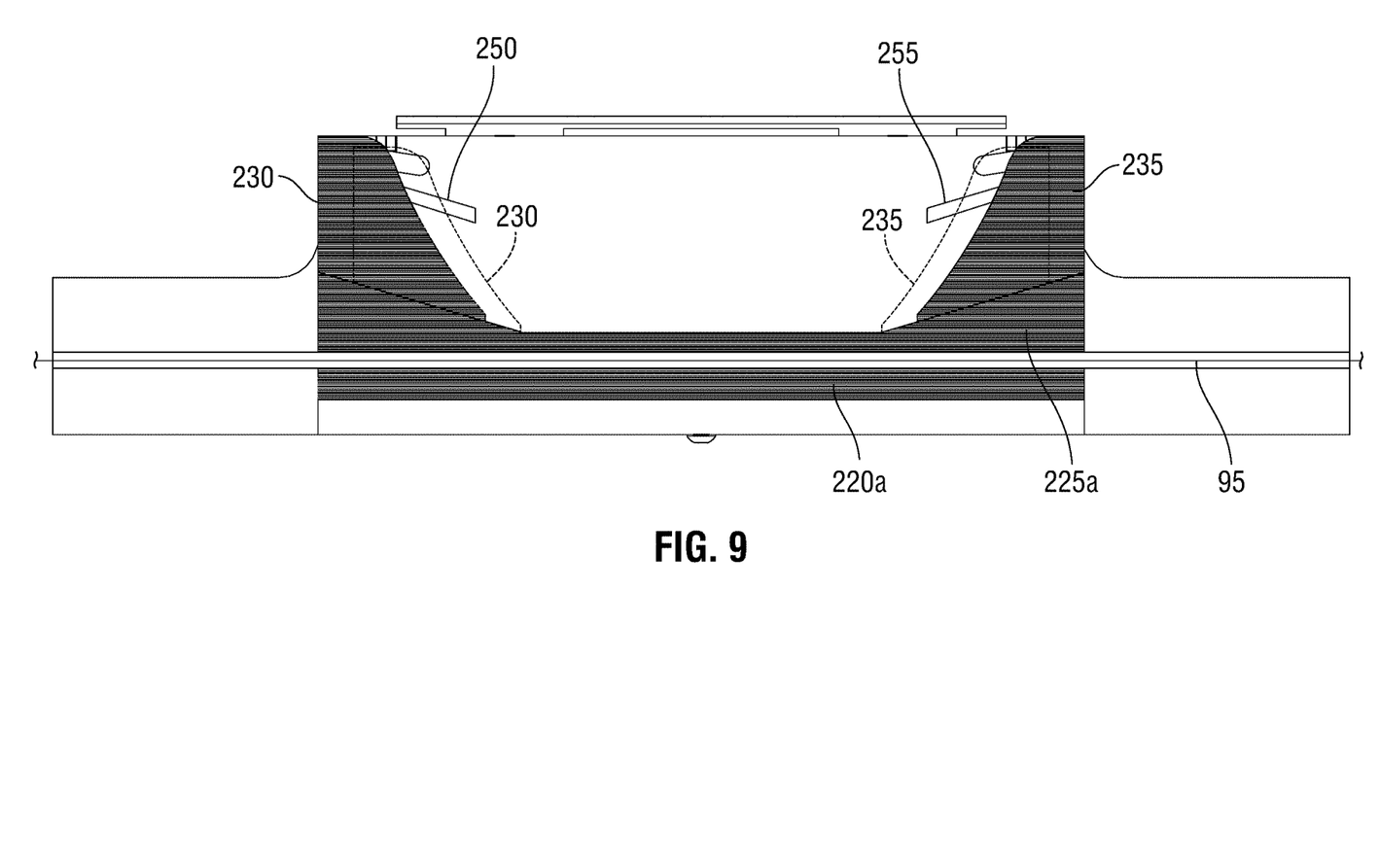
FIG. 9 is front view of one embodiment of the current invention.

FIG. 8 is a partially assembled view of one embodiment of a sealing jaw of the present invention. FIG. 8 has many similar attributes to those disclosed in FIG. 1. As illustrated in FIG. 8, in many embodiments of the current invention, the inserts 230 and 235 have an inclined base which is parallel to an inclined upper surface of the lower sealing bar 225.

In several embodiments, frame 10 has a concave interior 12 side with alignment extensions 250 and 255 on opposite ends of the concave interior 12 of frame 10. In several embodiments of the present invention, alignment extensions 250 and 255 act as guide rails for inserts 230 and 235. In some embodiments, the alignment extensions 250 and 255 are incorporated into frame 10 to prevent rotational and vertical misalignment of the inserts 230 and 235 during the sealing operation. Alignment extensions 250 and 255 can be constructed in any geometric shape capable of interfacing with inserts 230 and 235 (as well as insert base or lower sealing surface 225).

In several embodiments, frame 10 is constructed with an insert base 225 which is preferably located in the concave interior 12 and at distance below the extensions 250 and 255. In several embodiments, insert base 225 is constructed in any geometric shape capable of interfacing with inserts 230 and 235, as well as alignment extensions 250 and 255. In several embodiments of the present invention, alignment extensions 250 and 255 are integral to the insert base 225 and fabricated from the insert base 225 as one unit. In several embodiments, insert base 225 has a textured interior face 225a which is designed to interface with package in working operations. In some embodiments, located below and parallel to insert base 225 is top seal bar 20. In several embodiments, top seal bar 20 is constructed in any geometric shape. In several embodiments, top seal bar 20 has a textured interior face 20a which is designed to interface with package in working operations. In many embodiments, insert base 225 and top seal bar 20 are the sealing surfaces that contact the film web during the sealing operation. These surfaces form respectively the horizontal bottom seal and the vertical top seal of the package. These surfaces are coplanar and coincident with insert sealing surfaces. In some embodiments, the top seal bar 20 top surface can be the top edge of the bottom seal of a package. The lower edge of inserts 30, 35, 130, 135, 230 or 235 contacts top surface of top seal bar 20 to maintain sealing integrity.

As similarly illustrated in FIG. 1, a second sealing jaw main assembly would be required and in several embodiments would be the mirror assembly of first sealing jaw main assembly 100 such that in operation the two sealing jaw main assemblies can interface with each other and seal a package by means of direct peak and valley contact of the serrated surface with the opposite jaw serrated surfaces, thereby creating a serrated seal in the film web. In some embodiments, the seal surface could comprise of any geometric shape that causes the film web to compress and become heated.

In several embodiments, inserts 30, 35, 130, 135, 230 and 235 can be of variant geometric shape, however, in some embodiments the shape is of a 3-dimension descending curve with a patterned or textured front face 240a or 240b and a wedge back cut out 37a or 37b for interfacing with extensions 50, 55, 150, 155, 250 or 255, respectively (FIGS. 3, 4, 8 and 9). In several embodiments, inserts 30, 35, 130, 135, 230 and 235 can be comprised of materials such as metals, composites, or industrial plastics as used in the packaging industry. In several embodiments, the inserts 35, 155 and 235 are referenced as left-handed and inserts 30, 130 and 230 are referenced as right-handed. In several embodiments, in order for the inventive sealing jaw assembly to function, it requires a left-hand and right-hand insert. In several embodiments, inserts 30, 35, 130, 135, 230 and 235 are affixed to the main frames 10 and 110 by a method that securely and accurately positions the inserts during the sealing operation of the bottom gusseted package.

While the present invention is susceptible of embodiment in various forms, there is shown in the drawings the presently preferred embodiments, with the understanding that the present disclosure should be considered as an exemplification of the invention and is not intended to limit the invention to the specific embodiments illustrated.

While preferred embodiments have been shown, and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied.

What is claimed is the following:

1. A sealing jaw device comprising:
   a first jaw frame assembly comprising:
      a first frame, first and second inserts, and a first lower sealing bar;

said first frame further comprising a first adjustment slot;

said first frame further comprising a first set of pins to secure the first and second inserts to the frame through said first adjustment slot;

said first frame further comprising the first lower sealing bar mechanically attached to the first frame;

wherein said first and second inserts engage said first frame about said first adjustment slot such that said inserts are secured about said first frame by the first set of pins through said first adjustment slot;

wherein the first and second inserts have a distance between them and are moveable in relationship to each other about said first adjustment slot;

a second jaw frame assembly comprising:
 a second frame, third and fourth inserts and a second lower sealing bar;
 said second frame further comprising a second adjustment slot;
 said second frame further comprising a second set of pins to secure the third and fourth inserts to the frame through said second adjustment slot;
 said second frame further comprising the second lower sealing bar mechanically attached to the second frame;

wherein said third and fourth inserts engage said second frame at a distance from each other about said second adjustment slot such that said inserts are secured about said second frame by the second set of pins through said second adjustment slot.

2. The sealing jaw device of claim 1 further comprising:
the first, second, third and fourth inserts may be interchanged with another set of fifth, sixth, seventh and eighth inserts with varying geometric shapes;
 wherein each first, second, third, fourth, fifth, sixth, seventh and eighth insert may be exchanged without the disassembly of the sealing jaw device.

3. The sealing jaw device of claim 1 further comprising:
said first, second, third and fourth inserts are heated.

4. The sealing jaw device of claim 1 further comprising:
said lower sealing bars are heated.

5. The sealing jaw device of claim 1 further comprising:
said first, second, third and fourth inserts have an engagement face which may be comprised of varying geometric shapes or designs.

6. The sealing jaw device of claim 1 further comprising:
the distance between the first and second, and the third and fourth inserts is adjustable.

7. The sealing jaw device of claim 5 further comprising;
the shape of a seal is changed by interchanging said first, second, third, and fourth inserts.

8. A method for creating a seal comprising the steps:
obtaining a first jaw frame assembly, said first jaw frame assembly comprising:
 a first frame, first and second inserts, and a first lower sealing bar;
 said first frame further comprising a first adjustment slot;
 said first frame further comprising a first set of pins to secure the first and second inserts to the frame through said first adjustment slot;
 said first frame further comprising the first lower sealing bar mechanically attached to the first frame;
  wherein said first and second inserts engage said first frame about said first adjustment slot such that said inserts are secured about said first frame by the first set of pins through said first adjustment slot;
  wherein the first and second inserts have a distance between them and are moveable in relationship to each other about said first adjustment slot;
obtaining a second jaw frame assembly, said second jaw frame assembly, comprising:
 a second frame, third and fourth inserts and a second lower sealing bar;
 said second frame further comprising a second adjustment slot;
 said second frame further comprising a second set of pins to secure the third and fourth inserts to the frame through said second adjustment slot;
 said second frame further comprising the second lower sealing bar mechanically attached to the second frame;
  wherein said third and fourth inserts engage said second frame at a distance from each other about said second adjustment slot such that said inserts are secured about said second frame by the second set of pins through said second adjustment slot;
obtaining material for sealing;
placing the material for sealing between said first and second jaw frame assemblies, compressing said first and second jaw assemblies on said material for sealing and applying heat to the first, second, third and fourth inserts creating a seal on said material for sealing.

9. The method for creating a seal of claim 8 further comprising:
the first, second, third and fourth inserts may be interchanged with another set of fifth, sixth, seventh and eighth inserts with varying geometric shapes;
 wherein each first, second, third, fourth, fifth, sixth, seventh and eighth inserts may be exchanged without the disassembly of each jaw frame assembly.

10. The method for creating a seal of claim 8 further comprising:
said lower sealing bars are heated.

11. The method for creating a seal of claim 8 further comprising:
said first, second, third and fourth inserts have an engagement face which may be comprised of varying geometric shapes or designs.

12. The method for creating a seal of claim 8 further comprising:
the distance between the first and second, and the third and fourth inserts is adjustable.

13. The method for creating a seal of claim 11 further comprising:
the shape of the seal is changed by interchanging said first, second, third and fourth inserts.

* * * * *